United States Patent [19]

Hager et al.

[11] 4,267,057
[45] May 12, 1981

[54] WATER TREATMENT FOR SELECTIVE REMOVAL OF NITRATES

[75] Inventors: Donald G. Hager; Frederick Rubel, Jr., both of Tucson, Ariz.

[73] Assignee: Aluminum Company of America, Pittsburgh, Pa.

[21] Appl. No.: 113,354

[22] Filed: Jan. 18, 1980

[51] Int. Cl.³ .............................................. C02F 1/28
[52] U.S. Cl. .................. 210/678; 210/683; 210/903
[58] Field of Search ............... 210/DIG. 28, 37 R, 39, 210/40, 30 R, 32

[56] References Cited

U.S. PATENT DOCUMENTS

| | | | |
|---|---|---|---|
| 3,017,347 | 1/1962 | Kratz | 210/39 |
| 3,244,621 | 4/1966 | Bouthilet | 210/40 |
| 3,276,186 | 10/1966 | Hronas et al. | 210/40 |
| 3,401,114 | 9/1968 | Carlton et al. | 210/40 |
| 3,408,289 | 10/1968 | Gustafson | 210/27 |
| 3,429,808 | 2/1969 | Smith | 210/39 |
| 3,436,344 | 4/1969 | Canning et al. | 210/39 |
| 3,444,079 | 5/1969 | Bowers | 210/39 |
| 3,455,820 | 7/1969 | Joyce et al. | 210/40 |
| 3,650,949 | 3/1972 | Hager et al. | 210/39 |
| 3,817,862 | 6/1974 | Hoke | 210/39 |
| 4,134,861 | 1/1979 | Roubinek | 210/37 R |
| 4,187,195 | 2/1980 | Kennedy | 210/40 |

FOREIGN PATENT DOCUMENTS

| | | | |
|---|---|---|---|
| 2323644 | 4/1977 | France | 210/40 |
| 51-109155 | 9/1976 | Japan | 210/DIG. 28 |

OTHER PUBLICATIONS

Weber Jr. W. et al.; "Physicochemical Treatment of Wastewater"; presented at the 42nd Annual Conf. of the W.P.C.F., Dallas, Texas (1969).
Hassler J. W.; "Purification with Activated Carbon"; Chem. Pub. Co. Inc., New York, N.Y. pp. 98–102, 133, 134 & 200–203 (1974).

Primary Examiner—Benoît Castel
Attorney, Agent, or Firm—Lyndanne M. Whalen; Glenn E. Klepac; David W. Brownlee

[57] ABSTRACT

Water is treated to selectively remove substantially all of the nitrates present. This selective removal of nitrates is accomplished by adjusting the pH of the water to be treated, if necessary, to a pH of less than 8, and then passing the pH-controlled water through activated carbon. In one of the preferred embodiments, the spent activated carbon is substantially completely regenerated by backwashing to permit reuse of the carbon.

11 Claims, 2 Drawing Figures

WATER TREATMENT FOR SELECTIVE REMOVAL OF NITRATES

BACKGROUND OF THE INVENTION

Palatability is a basis on which the purity of a water supply is judged. A foreign taste and/or odor suggests contamination and that the water may not be safe. However, not all impurities cause such noticeable characteristics. Nitrates, for example, are undetectable by the senses, yet they may be physiologically harmful. In normal quantities, nitrates become toxic under conditions in which they are reduced to nitrites. In humans, consumed nitrates may be reduced to nitrites in the gastrointestinal tract. These nitrites react directly with hemoglobin to produce methemoglobin, which impairs oxygen transport.

Because water is essential to life itself, it has been subjected to treatment by a wide variety of techniques and procedures in an effort to remove impurities which render the water harmful or distasteful. Much effort has been directed toward removing taste and odor causing compounds. U.S. Pat. No. 3,650,949, for example, discloses a method for removing cyanides from water by using copper salts and oxygen. Hydrogen sulfide has been removed from water with copper oxide by Hronas et al. (U.S. Pat No. 3,276,186). Many of these procedures involve the use of activated carbon at some stage of the treatment. Kratz in his patent for "Process of Purifying Water with Activated Carbon" (U.S. Pat. No. 3,017,347), for example, oxidized heavy metal compounds present in water and then passed the treated water through a deep bed of activated carbon. The oxidized heavy metal compounds were adsorbed in the upper portion of the bed while taste and odor causing compounds were adsorbed in the lower portion of the bed.

A more complicated procedure for purifying water was claimed by Bowers in U.S. Pat. No. 3,444,079 for "Method and Apparatus for Demineralizing Water". Bowers first passed water containing organic foulants through a cation exchanger, and then through a bed of activated carbon and then through an anionic exchanger to remove foulants. Gustafson's procedure described in U.S. Pat. No. 3,408,289 for "Method for Waste Water Renovation" is even more complex. Gustafson treated sewage plant effluent by softening, flocculation, filtration, demineralization with a cation exchanger and then passing the pretreated water through activated carbon to remove undesirable organic materials.

Until now, however, an economic and efficient method for selectively removing potentially dangerous nitrates from water has not been available. With concern about the effect of nitrites upon the health and well-being of humans growing, it has become more important than ever to find a relatively simple yet effective means for removing the potential source of nitrites (i.e. nitrates) from water intended for human consumption.

SUMMARY OF THE INVENTION

It is an object of the present invention to provide a method for selectively removing nitrates from water. Nitrate-containing water is pH adjusted, if necessary, to a pH less than 8. This pH-adjusted water is then passed through activated carbon to remove substantially all of the nitrates present.

It is a further object of the present invention to provide an economically efficient water purification process for the selective removal of nitrates, which process may include regeneration of spent activated carbon and reuse of regenerant solutions.

DETAILED DESCRIPTION OF THE PREFERRED EMBODIMENTS

Figure 1:
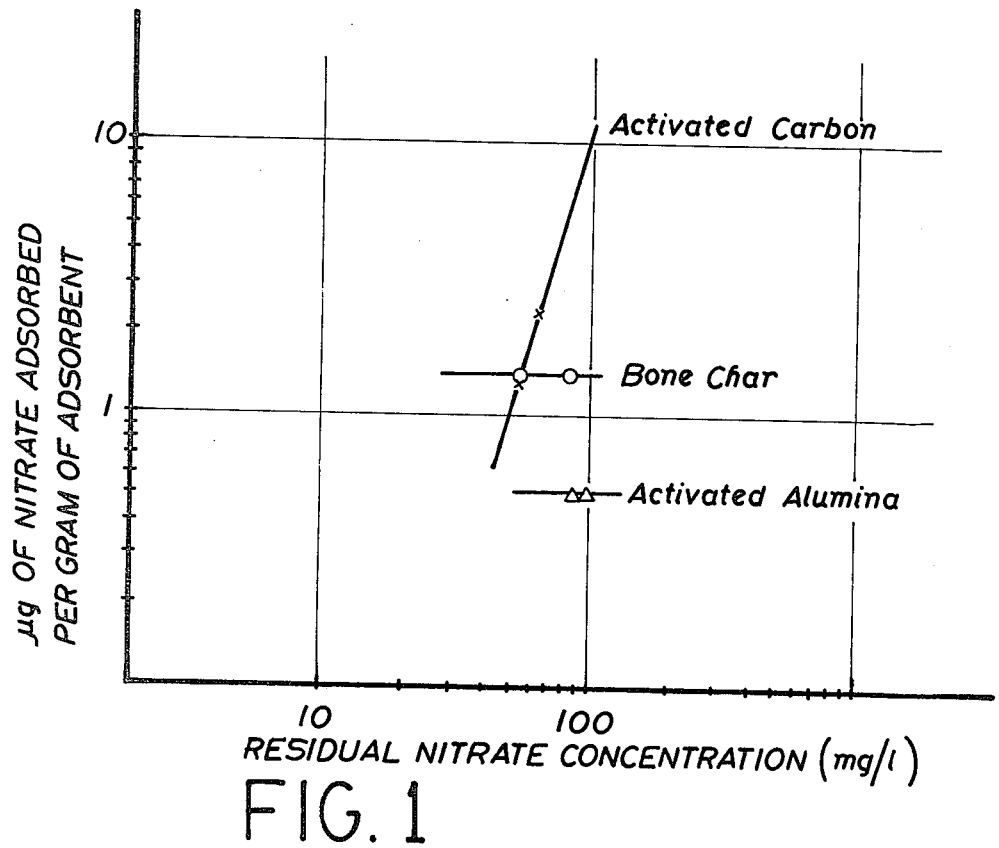
FIG. 1 is a graph on log/log paper with mg adsorbed per gram of adsorbent plotted against residual nitrate concentration (mg/l).

The pH of the nitrate-containing water to be treated in accordance with the present invention is measured. If the pH is greater than 8, the pH is lowered by any of the methods standard in the art. The method used in the examples below consisted of adding a strong mineral acid (such as sulfuric or hydrochloric acid) to the water to be treated until the measured pH was within the desired range. The preferred pH is between 2.0 and 4.5. In a continuous operation, the pH of the water to be treated is monitored and adjusted at periodic intervals.

The pH-controlled water is then passed through a bed or a column of activated carbon. The activated carbon may be any such carbon which is commercially available, including those carbons which have been pretreated by techniques standard in the art (e.g. acid washing). It has been found that activated carbon which has been acid washed prior to use is particularly effective in removing nitrates from water. Any inorganic acid, with the possible exception of nitric acid, could be used in such a pretreatment. Such an acid is not limited to a particular concentration; however, economics make a dilute acid desirable. A one percent solution of sulfuric acid was found to be particularly effective.

The pH-adjusted water may be fed through the activated carbon at a rate of 0.5 to 1.0 gpm/ft$^3$. Because the rate is dependent upon the bed depth of the activated carbon and the nitrate content of the water being treated, the most suitable flow rate will vary for each particular system.

In one of the preferred embodiments of the invention, the spent activated carbon may be regenerated. The point at which regeneration is desirable may be determined by periodically measuring the nitrate concentration of the treated water and comparing the measured concentration with a predetermined standard. When the nitrate concentration reaches the limit established for a potable water, the flow of pH-adjusted water to the activated carbon is stopped. Free flowing water present in the bed is then drained. An alkaline solution is then contacted with the carbon by either an upward or downward flow. Alkaline solutions suitable to the practice of this invention include sodium hydroxide, ammonium hydroxide and potassium hydroxide. The concentration of this alkaline solution may be from 0.05% to 5%, with 0.25% to 2% being the preferred range.

After being contacted with the alkaline solution, the regenerated carbon is rinsed with relatively nitrate-free water. This rinse water may also be stored and reused in subsequent regeneration of the spent activated carbon. The capability of reusing the regenerate solutions cuts the amount of treated water which must be used in backwashing the adsorbent bed.

The present invention may be better appreciated in terms of the following examples.

bents being evaluated for its nitrate-removing capacity are presented in Table I.

TABLE I

| Test No. | Adsorbent | Adsorbent Weight (gms) | Water Washing Pretreatment | Test Solution | | |
|---|---|---|---|---|---|---|
| | | | | Volume ml | pH | Initial Nitrate Concentration mg/l | Final Nitrate Concentration mg/l |
| 1 | Activated alumina | 25.0 | None | 1,000 | 6/7 | 16 | 22 |
| 2 | " | 10 | A | 500 | ¾ | 110 | 100 |
| 3 | " | 20 | B | 500 | ¾ | 98 | 81 |
| 4 | " | 20 | B | 500 | 4/5 | 98 | 82 |
| 5 | " | 20 | B | 500 | ½ | 98 | 100 |
| 6 | " | 20 | C | 500 | ¾ | 119 | 75 |
| 7 | Bone Char | 20 | A | 500 | ¾ | 110 | 54 |
| 8 | " | 10 | A | 500 | ¾ | 110 | 82 |
| 9 | Activated carbon | 20 | A | 500 | ½ | 110 | 56 |
| 10 | " | 20 | D | 500 | 1.5 | 114 | 13 |
| 11 | " | 5 | D | 500 | 1.5 | 114 | 53 |
| 12 | " | 20 | D | 500 | 3.0 | 114 | 13 |
| 13 | " | 5 | D | 500 | 3.0 | 114 | 57 |
| 14 | " | 20 | D | 500 | 4.5 | 114 | 16 |
| 15 | " | 5 | D | 500 | 4.5 | 114 | 60 |

A - 500 ml of pH 3 solution followed by two washings with 500 ml of pH 7 solution
B - 300 ml of pH 1 solution followed by two washings with 300 ml of pH 4 solution
C - three washings with 600 ml of pH 7 solution
D - 500 ml of 5% $H_2SO_4$ followed by two washings with 500 ml of pH 7 solution

EXAMPLES

A series of adsorption isotherm tests were conducted to evaluate nitrate and nitrite removal from water by using (1) powered activated alumina, (2) powdered activated carbon and (3) powdered bone char as adsorbents. Each of the enumerated powdered adsorbents was treated in the following manner prior to testing their nitrate-removing capability: (a) the adsorbent was first added to either deionized water or an acidic water medium and then shaken for a period of 10 to 15 minutes; (b) the pH of the shaken mixture was measured and adjusted to the pH being studied by addition of an appropriate amount of a mineral acid (other than nitric); (c) the shaken mixture was then permitted to settle for a period of one hour; (d) the deionized water or acidic water medium was decanted from the mixture; (e) the thus treated adsorbent was then washed several times with waters having the desired pH.

For these adsorption iostherm tests, a sodium nitrate solution of known concentration was prepared to better limit variables other than those associated in the adsorbent and its pretreatment. The standardized sodium nitrate solution was made by adding sodium nitrate to deionized water in an amount sufficient to obtain a concentration of approximately 200 mg/l. The adsorbent was weighed and measured amounts of the sodium nitrate solution were then added to the washed adsorbent (prepared as described in the above paragraph). A control (i.e. sodium nitrate solution without an adsorbent) was also run with each test.

The pH of the sodium nitrate-adsorbent mixtures and the control was measured and, if greater than 6, adjusted by addition of a mineral acid (other than nitric). The mixtures were then shaken for a period of two hours. During this shaking period, the pH of the mixture was monitored and whenever the pH rose above 6.0, sufficient acid was added to lower the pH to the initial level of the mixture. After shaking, the sodium nitrate-adsorbent mixture was allowed to settle. The supernatant liquid was then decanted from the mixture. The test variables and test results for each of the adsorbents being evaluated for its nitrate-removing capacity are presented in Table I.

Tests 1 through 6 indicate that activated alumina does adsorb some nitrate when the alumina has been pretreated with an acidic wash solution. The amount the nitrate removed by the pretreated activated alumina is, however, not very large as can be seen from the results of the best test, i.e. Test 2 and 3. In Test 2, for example, the weight percent pickup of nitrate at 100 mg/l concentrations was about 0.05 wt.% based on the alumina. Weight percent pickup is calculated as follows:

$$\text{Wt. \% Pickup} = 100\% \times \frac{\text{Vol }([NO_3^-]_{init} - [NO_3^-]_{final})}{\text{Adsorbent Wt.}}$$

Tests 7 and 8 show that bone char also adsorbs nitrates from nitrate-containing water having a pH of less than 6. The bone char, however, was found to be a better adsorbent than activated alumina. Tests 9 through 12 illustrate that activated carbon is by far the best of the three adsorbents evaluated. This fact may best be appreciated by considering FIG. 1.

FIG. 1 is a plot of log/log graph paper of micrograms of nitrate adsorbed per gram of adsorbent vs. residual nitrate concentration in mg/l. The points on the graph reflect the data presented in Table I. The y coordinate (hereinafter called weight pickup) was determined by multiplying the difference between the initial and final nitrate concentrations by the volume of the test solution and dividing this product by the weight of the adsorbent. The x coordinate is the final nitrate concentration. The coordinates are plotted on log/log paper to facilitate interpretation of the data in terms of the Freundlich adsorption equation:

$$\log x = \log k + n \log c$$

where $x$ = the amount of material adsorbed on mass, m of the adsorbent, $k$ is a constant equal to the antilog of the intercept, $n$ = the slope of the line, and $c$ = the concentration of a substance solution phase (in this case, nitrate).

It can be seen from FIG. 1 that of the three adsorbents tested for their nitrate-removing capacity, activated carbon is the only one which has a weight pickup which increases substantially at higher concentrations. Extrapolation of the data points for activated alumina, bone char and activated carbon to a nitrate concentration of 100 mg/l shows a weight pickup of 0.05% for activated alumina, 0.15% and 1.0% for activated carbon.

Figure 2:
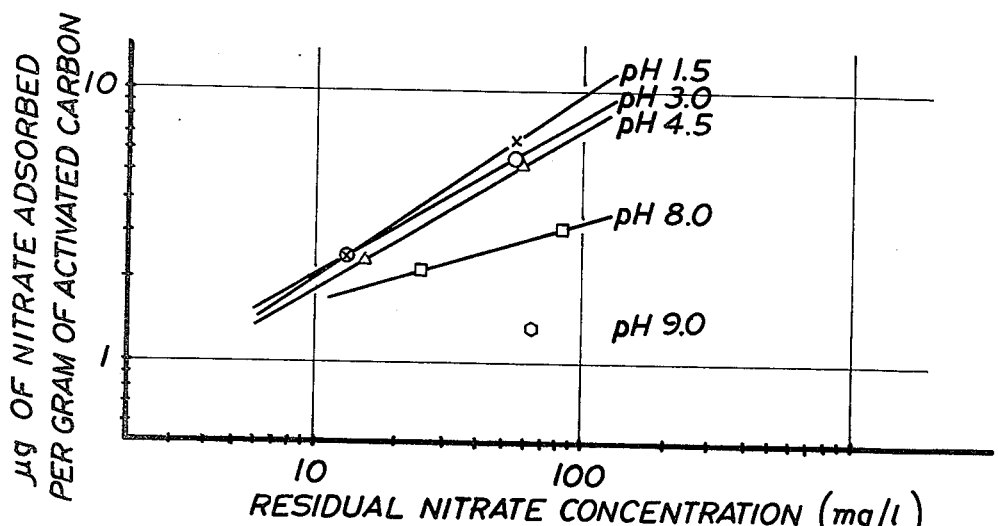
FIG. 2 is a graph showing the effect of pH upon nitrate adsorption. Milligrams of nitrate adsorbed per gram of activated carbon is plotted against residual nitrate concentration (mg/l).

FIG. 2 which is also a plot of weight pickup vs. residual nitrate concentration is intended to show the influence of the pH of the nitrate-containing water upon the capacity of activated carbon to remove nitrates. The points on this graph were derived from the data of Tests 9 through 15. Extrapolation of the data for each of the pH's tested to 100 mg/l nitrate concentration indicates a weight pickup of 10, 8.0 and 7.0 micrograms of nitrate at pH levels of 1.5, 3.0 and 4.5, respectively. These figures make it clear that the pH of the water to be treated does affect nitrate removal. The data also indicates that best nitrate removal results are achieved when the water to be treated has a low pH.

In developing a water treatment system like that of the present invention, it is particularly desirable to use an adsorbent material which can be regenerated rather than a material which must be frequently replaced. To determine the feasibility of regenerating the activated carbon used in removing nitrates, the following tests were run. The water-activated carbon mixtures of Examples 10 through 15 were each made alkaline by addition of sufficient sodium hydroxide to raise the pH to a level between 9 and 11. Each of these carbon-alkaline water mixtures was then shaken for a period of two hours. Thereafter, the concentration of nitrate present due to release by the spent activated carbon was determined. The data obtained is presented in Table II.

TABLE III

| Period Minutes | ml Water Treated (between measurements) | Influent Nitrate mg/l | Ending Effluent Nitrate mg/l | mg Nitrate Removed |
| --- | --- | --- | --- | --- |
| 30 | 1,500 | 105 | 16.2 | 67 |
| 180 | 7,500 | 105 | 2.5 | 717 |
| 240 | 3,000 | 105 | 4.7 | 304 |
| 420 | 9,000 | 105 | 22.0 | 824 |
| TOTAL | 21,000 | | | 1,912 |

The nitrate removal efficiency of the activated carbon column was calculated as follows:

$$\frac{\text{Total mg Nitrate Removed}}{\text{Total Vol. Water Treated} \times \text{Influent Nitrate Conc.}} \times 100\%$$

In this case, the nitrate removal efficiency was 86.7%.

EXAMPLE 2

To determine whether spent activated carbon could be regenerated to a degree sufficient to permit its reuse rather than replacement in a continuous water treatment operation, the following test was made. Three hundred grams of granular activated carbon were mixed with one liter of 1% sulfuric acid. The mixture was then boiled and stirred for a period of five minutes and drained before being charged to a two-inch I.D. column equipped with support media for the carbon. Nitrate-containing water which was adjusted to a pH of 1.5 by acid addition during the course of the operation was then passed through the column of activated car-

TABLE II

| | | | Test Solution | | |
| --- | --- | --- | --- | --- | --- |
| Test No. | Adsorbent | Adsorbent Weight (gms) | pH | Initial Nitrate Concentration mg/l | Final Nitrate Concentration mg/l |
| | Activated carbon | To the above test solutions (with carbon) 10% NaOH was added to bring the pH to the below indicated pH levels and again shaken for two hours. | | | |
| 10' | " | 20 | 8 | 114 | 25 |
| 11' | " | 5 | 8.6 | 114 | 84 |
| 12' | " | 20 | 9.6 | 114 | 62 |
| 13' | " | 5 | 9.8 | 114 | 66 |
| 14' | " | 20 | 10.3 | 114 | 63 |
| 15' | " | 5 | 11.2 | 114 | 114 |

Comparison of the Initial Nitrate Concentration (i.e. before the activated carbon was added) with the Final Nitrate Concentration (i.e. after the treated water had been made alkaline to promote release of adsorbed nitrate) indicates complete nitrate release by the carbon at a pH in excess of 11 while at a pH of 8 the amount of nitrate released was slight.

EXAMPLE 1

Three hundred grams of granular activated carbon were mixed with one liter of 1% sulfuric acid. The mixture was then boiled and stirred for a period of five minutes, drained and rinsed with deionized water having a pH of 7 and charged into a two-inch I.D. (inner diameter) column equipped with support media for the carbon. Nitrate-containing water which was adjusted to a pH of 4.4 by acid addition during the course of the operation was then passed through the column of activated carbon at a rate of 50 ml/min. The data collected is presented in Table III.

bon at a rate of 50 ml/min. The nitrate-containing water was passed through the column of activated carbon until equilibrium was reached (i.e. the nitrate concentration of the effluent was equal to the nitrate concentration of the influent). Thirty liters were passed through the column before equilibrium was reached. Calculations for this run showed that 2,144 mg of nitrate had been removed.

The spent activated carbon was then drained of residual water. A dilute sodium hydroxide solution (1%) was passed upward through the spent carbon bed at a rate of 35 ml/min. for a period of 75 minutes. After the caustic solution was passed through, the bed was backwashed with water (nitrate concentration=6 mg/l) at a rate of first 35 ml/min. for a period of two hours and then 75 ml/min. for one hour. The water was then drained from the column of carbon and dilute sodium hydroxide was passed downward through the carbon at 35 ml/min. for a period of 30 minutes. The carbon was subsequently rinsed again with water having a nitrate concentration of 6 mg/l by passing the water through the bed at a rate of 35 ml/min. for one hour.

The regenerant solution was then analyzed to determine the amount of nitrate removed from the regenerated activated carbon bed. This analysis showed the presence of 1974 mg of nitrate present in the 1% sodium hydroxide solution after passage of the caustic through the spent activated carbon bed. When this figure is compared with the 2144 mg of nitrate which has been calculated as being adsorbed on the spent carbon before the caustic was passed through, it is seen that 92% of the adsorbed nitrate was released from the spent carbon.

The thus regenerated carbon bed was then reused to remove nitrates from water. The nitrate-containing water was pH adjusted during the operation to a pH of 2, before being passed through the carbon bed at a rate of 50 ml/min. The data collected is presented in Table IV.

TABLE IV

| Period Minutes | ml Water Treated (between measurements) | Influent Nitrate mg/l | Ending Effluent Nitrate mg/l | mg Nitrate Removed |
|---|---|---|---|---|
| 37.5 | 1,875 | 126 | 24 | 96 |
| 132.5 | 4,750 | 126 | 11 | 515 |
| 192.5 | 3,000 | 126 | 4.2 | 355 |
| 267.5 | 3,750 | 126 | 6 | 453 |
| 492.5 | 11,250 | 126 | 52 | 1,086 |
| 657.5 | 8,250 | 126 | 126 | 180 |
| TOTAL | 32,875 | | | 2,685 |

The nitrate removal efficiency of the regenerated activated carbon bed for this run was 64.8%.

EXAMPLE 3

The following test run was conducted to determine the nitrate removal efficiency and weight pickup for granular activated carbon which had not been acid washed prior to use. Water which had been adjusted to a pH of 2.2 was passed through 300 grams of carbon which had not been prewashed with acid in Run A. When equilibrium was reached (i.e. when the nitrate concentration of the effluent equaled that of the influent), the spent carbon of Run A was regenerated by the same procedure as that of Example 2 using a 0.5% NaOH regenerating solution and a water rinse of a pH of 1.5. The regenerating carbon was then reused in Run B. The results were as follows:

| | Run A | Run B |
|---|---|---|
| Flow Rate ml/min. | 100 | 80 |
| Influent Nitrate Concentration mg/l | 84 | 88 |
| Effluent pH | 2-3 | 2-2.5 |
| Total Nitrate Removed (mg) | 925 | 2257 |
| Total Nitrate Applied (mg) | 1550 | 3256 |
| % Nitrate Removal Efficiency | 59.6 | 69 |
| % Nitrate Weight Pickup on Carbon | 0.31 | 0.75 |

Comparison of these results with those of Examples 1 and 2 shows that the nitrate removal efficiency for carbon which has not been prewashed with acid is comparable to that for acid washed carbon. The nitrate weight pickup for the initial run (i.e. A) when unwashed carbon was used was lower than that for acid washed carbon; however, the regenerated carbon used in Run B had a nitrate weight pickup comparable to that for the carbons used in Examples 1 and 2.

What is believed to be the best mode of the present invention has been described above. It will be apparent to those skilled in the art that numerous variations of the illustrated details may be made without departing from the spirit and scope of the present invention.

What is claimed is:

1. A method for treating nitrate-containing potable water for selectively removing substantially all of the nitrate present in the water comprising the steps of:
   (a) controlling the pH of nitrate-containing water such that the pH is less than 8; and
   (b) passing the pH-controlled water through activated carbon to remove substantially all of the nitrate initially present in the water.

2. A method for treating nitrate-containing potable water for selectively removing substantially all of the nitrate present in the water comprising the steps of:
   (a) controlling the pH of nitrate-containing water such that the pH is less than 8;
   (b) passing the pH-controlled water through activated carbon to remove substantially all of the nitrate initially present in the water;
   (c) removing the treated water; and
   (d) periodically backwashing the activated carbon having nitrates present thereon with a dilute alkaline solution to regenerate the activated carbon and permit its reuse.

3. The method of claim 2 wherein the activated carbon is washed with a dilute inorganic acid solution other than nitric acid before the nitrate-containing water is passed through the activated carbon.

4. The method of claim 3 wherein the acid solution used to pretreat the activated carbon is a mineral acid having a concentration of 1 to 10 wt.%.

5. The method of claim 2 in which the dilute alkaline solution used to regenerate the activated carbon is reused in subsequent regenerations.

6. The method of claim 2 in which the dilute alkaline solution is selected from the group consisting of sodium hydroxide, ammonium hydroxide and potassium hydroxide.

7. The method of claim 6 in which the dilute alkaline solution has a concentration of 0.25 to 2.0 wt.%.

8. The method of claim 2 in which the backwashing of the activated carbon is followed by a rinsing of the backwashed carbon with essentially nitrate-free water.

9. The method of claim 2 in which the pH of the water to be treated is adjusted to a pH between 2.0 and 4.5.

10. The method of claim 2 wherein the pH of the nitrate-containing water is less than 6.

11. The method of claim 3 in which the dilute inorganic acid is sulfuric acid.

* * * * *